United States Patent
Castmo

(10) Patent No.: US 12,490,314 B2
(45) Date of Patent: Dec. 2, 2025

(54) WIRELESS NETWORK ACCESS FOR USER TERMINAL DEVICE AND GATEWAY DEVICE IN VEHICLE

(71) Applicant: VOLVO TRUCK CORPORATION, Gothenburg (SE)

(72) Inventor: Thomas Castmo, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 673 days.

(21) Appl. No.: 17/759,345

(22) PCT Filed: Jan. 29, 2020

(86) PCT No.: PCT/EP2020/052152
§ 371 (c)(1),
(2) Date: Jul. 22, 2022

(87) PCT Pub. No.: WO2021/151482
PCT Pub. Date: Aug. 5, 2021

(65) Prior Publication Data
US 2023/0044647 A1    Feb. 9, 2023

(51) Int. Cl.
*H04W 76/10*    (2018.01)
*G07C 5/00*    (2006.01)
*H04W 74/00*    (2009.01)

(52) U.S. Cl.
CPC ............ *H04W 76/10* (2018.02); *G07C 5/008* (2013.01); *H04W 74/002* (2013.01)

(58) Field of Classification Search
CPC ..... H04W 76/10; H04W 74/002; G07C 5/008
See application file for complete search history.

(56) References Cited

U.S. PATENT DOCUMENTS

| 9,607,449 B1 | 3/2017 | Chen |
| 10,141,967 B1 | 11/2018 | Mitra et al. |

(Continued)

FOREIGN PATENT DOCUMENTS

| CN | 102726004 A | 10/2012 |
| CN | 107005534 A | 8/2017 |

(Continued)

OTHER PUBLICATIONS

International Search Report and Written Opinion of the International Searching Authority in corresponding International Application No. PCT/EP2020/052152 mailed Aug. 31, 2020 (16 pages).

(Continued)

*Primary Examiner* — Ajay Cattungal
(74) *Attorney, Agent, or Firm* — Venable LLP; Jeffri A. Kaminski

(57) ABSTRACT

There is provided mechanisms for providing wireless network access to an external wide area network. A method is performed by a user terminal device. The method includes establishing a wireless connection to a gateway device located in a vehicle. The user terminal device is identified as a client to the gateway device. The user terminal device uses the gateway device as gateway for all data traffic exchanged between the user terminal device and the external wide area network. The method includes establishing wireless network access for the gateway device to the external wide area network. The gateway device is operatively connected to the external wide area network via the user terminal device. The user terminal device bridges all data traffic communicated between the gateway device and the external wide area network.

22 Claims, 5 Drawing Sheets

(56) References Cited

U.S. PATENT DOCUMENTS

| | | | |
|---|---|---|---|
| 2013/0055096 A1 | 2/2013 | Kim et al. | |
| 2014/0164579 A1 | 6/2014 | Douthitt et al. | |
| 2014/0269525 A1* | 9/2014 | Li | H04W 76/10 370/329 |
| 2015/0031381 A1* | 1/2015 | Kotecha | H04W 4/70 455/452.1 |
| 2015/0358955 A1* | 12/2015 | Kresse | H04L 67/12 370/329 |
| 2017/0274771 A1* | 9/2017 | Sisbot | G06T 11/60 |
| 2018/0160311 A1 | 6/2018 | Shaw et al. | |
| 2018/0350160 A1* | 12/2018 | Sainaney | G07C 5/0841 |
| 2022/0247678 A1* | 8/2022 | Atwal | H04B 7/18519 |

FOREIGN PATENT DOCUMENTS

| | | |
|---|---|---|
| CN | 107659916 A | 2/2018 |
| CN | 107771399 A | 3/2018 |
| CN | 108574726 A | 9/2018 |
| CN | 108668259 A | 10/2018 |
| EP | 2876855 A1 | 5/2015 |
| WO | 2011140439 A1 | 11/2011 |
| WO | 2016089267 A1 | 6/2016 |
| WO | 2021151482 A1 | 8/2021 |

OTHER PUBLICATIONS

Written Opinion of the International Preliminary Examining Authority in corresponding International Application No. PCT/EP2020/052152 mailed Dec. 7, 2020 (7 pages).

Second Written Opinion of the International Preliminary Examining Authority in corresponding International Application No. PCT/EP2020/052152 mailed May 20, 2021 (6 pages).

International Preliminary Report on Patentability in corresponding International Application No. PCT/EP2020/052152 mailed Oct. 18, 2021 (10 pages).

Chinese Search Report dated Apr. 24, 2024 in corresponding Chinese Patent Application No. 202080094007.8, 6 pages.

European Communication of a Notice of Opposition dated Jul. 21, 2025 in corresponding European Patent Application No. 20703698.9, 57 pages.

* cited by examiner

WIRELESS NETWORK ACCESS FOR USER TERMINAL DEVICE AND GATEWAY DEVICE IN VEHICLE

CROSS-REFERENCE TO RELATED APPLICATIONS

This application is a U.S. National Stage application of PCT/EP2020/052152, filed Jan. 29, 2020 and published on Aug. 5, 2021, as WO 2021/151482, all of which is hereby incorporated by reference in its entirety.

TECHNICAL FIELD

Embodiments presented herein relate to a method, a user terminal device, a computer program, and a computer program product for providing wireless network access to an external wide area network. Embodiments presented herein further relate to a method, a gateway device, a computer program, and a computer program product for obtaining wireless network access to an external wide area network.

BACKGROUND user terminal devices, such as smartphones, can be connected to a vehicle unit to provide connected services to vehicle occupants. These connected services may include hands-free calling, audio streaming, and integration with brought-in mobile device applications. Applications that are executed by the user terminal device can make use of the network connectivity of the user terminal device. However, applications that are executed by the vehicle might require connection to the user terminal device (e.g., via Wi-Fi, BLUETOOTH, or a universal serial bus (USB) interface) to utilize the network connectivity of the user terminal device.

Document U.S. Pat. No. 10,141,967 B1 relates to a virtual network interface for use by vehicle applications accessing network connectivity of a connected mobile device and discloses a system using a mobile phone connected to an external wide area network and a vehicle computing platform and wherein a virtual network is established in order to provide external wide area network access to the vehicle computing platform.

However it might still be cumbersome, or sometimes even impossible, to at the same time, connect the vehicle applications to the network and to the mobile phone. Additionally or alternatively, it might still be cumbersome, or sometimes even impossible, to at the same time, connect the mobile phone to the network and to the vehicle applications.

Hence, there is still a need for improved network connectivity for vehicle applications and/or for mobile phones communicating with such vehicle applications.

SUMMARY

An object of embodiments herein is to provide efficient network connectivity for vehicle applications and for mobile phones communicating with such vehicle applications, not suffering from the issues noted above or at least where the above issues are mitigated or reduced.

According to a first aspect there is presented a user terminal device for providing wireless network access to an external wide area network. The user terminal device comprises processing circuitry. The processing circuitry is configured to cause the user terminal device to establish a wireless connection to a gateway device located in a vehicle. The user terminal device is identified as a client to the gateway device. The user terminal device uses the gateway device as gateway for all data traffic exchanged between the user terminal device and the external wide area network. The processing circuitry is configured to cause the user terminal device to establish wireless network access for the gateway device to the external wide area network. The gateway device is operatively connected to the external wide area network via the user terminal device. The user terminal device bridges all data traffic communicated between the gateway device and the external wide area network.

According to a second aspect there is presented a method for providing wireless network access to an external wide area network. The method is performed by a user terminal device. The method comprises establishing a wireless connection to a gateway device located in a vehicle. The user terminal device is identified as a client to the gateway device. The user terminal device uses the gateway device as gateway for all data traffic exchanged between the user terminal device and the external wide area network. The method comprises establishing wireless network access for the gateway device to the external wide area network. The gateway device is operatively connected to the external wide area network via the user terminal device. The user terminal device bridges all data traffic communicated between the gateway device and the external wide area network.

According to a third aspect there is presented a user terminal device for providing wireless network access to an external wide area network. The user terminal device comprises an establish module configured to establish a wireless connection to a gateway device located in a vehicle. The user terminal device is identified as a client to the gateway device. The user terminal device uses the gateway device as gateway for all data traffic exchanged between the user terminal device and the external wide area network. The user terminal device comprises an establish module configured to establish wireless network access for the gateway device to the external wide area network. The gateway device is operatively connected to the external wide area network via the user terminal device. The user terminal device bridges all data traffic communicated between the gateway device and the external wide area network.

According to a fourth aspect there is presented a computer program for providing wireless network access to an external wide area network. The computer program comprises computer program code which, when run on processing circuitry of a user terminal device 200, causes the user terminal device to perform a method according to the second aspect.

According to a fifth aspect there is presented a gateway device for obtaining wireless network access to an external wide area network. The gateway device is located in a vehicle and comprises processing circuitry. The processing circuitry is configured to cause the gateway device to establish a wireless connection to a user terminal device. The user terminal device is identified as a client to the gateway device. The gateway device is operatively connected to the external wide area network via the user terminal device. The gateway device acts as gateway for all data traffic exchanged between the gateway device and the external wide area network as well as for all data traffic exchanged between the user terminal device and the external wide area network.

According to a sixth aspect there is presented a method for obtaining wireless network access to an external wide area network. The method is performed by a gateway device. The gateway device is located in a vehicle. The method comprises establishing a wireless connection to a user terminal device. The user terminal device is identified as a client to the gateway device. The gateway device is operatively connected to the external wide area network via the user terminal device. The gateway device acts as gateway for all data traffic exchanged between the gateway device and the external wide area network as well as for all data traffic exchanged between the user terminal device and the external wide area network.

According to a seventh aspect there is presented a gateway device for obtaining wireless network access to an external wide area network. The gateway device is located in a vehicle. The gateway device comprises an establish module configured to establish a wireless connection to a user terminal device. The user terminal device is identified as a client to the gateway device. The gateway device is operatively connected to the external wide area network via the user terminal device. The gateway device acts as gateway for all data traffic exchanged between the gateway device and the external wide area network as well as for all data traffic exchanged between the user terminal device and the external wide area network.

According to an eight aspect there is presented a computer program for obtaining wireless network access to an external wide area network, the computer program comprising computer program code which, when run on processing circuitry of a gateway device, causes the gateway device to perform a method according to the sixth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously, these aspects provide efficient network connectivity for vehicle applications and for user terminal devices communicating with such vehicle applications Advantageously, these aspects allow the user terminal device to maintain a wireless connection to the external wide area network for its internal applications and services.

Advantageously, these aspects allow the gateway device to establish a wireless connection to the external wide area network in an efficient manner.

Advantageously, these aspects allow establishment of an Internet protocol (IP) based connection between the user terminal device and the gateway device.

Further advantages and advantageous features of the herein disclosed embodiments are disclosed in the following description and in the dependent claims.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION OF EXAMPLE EMBODIMENTS

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
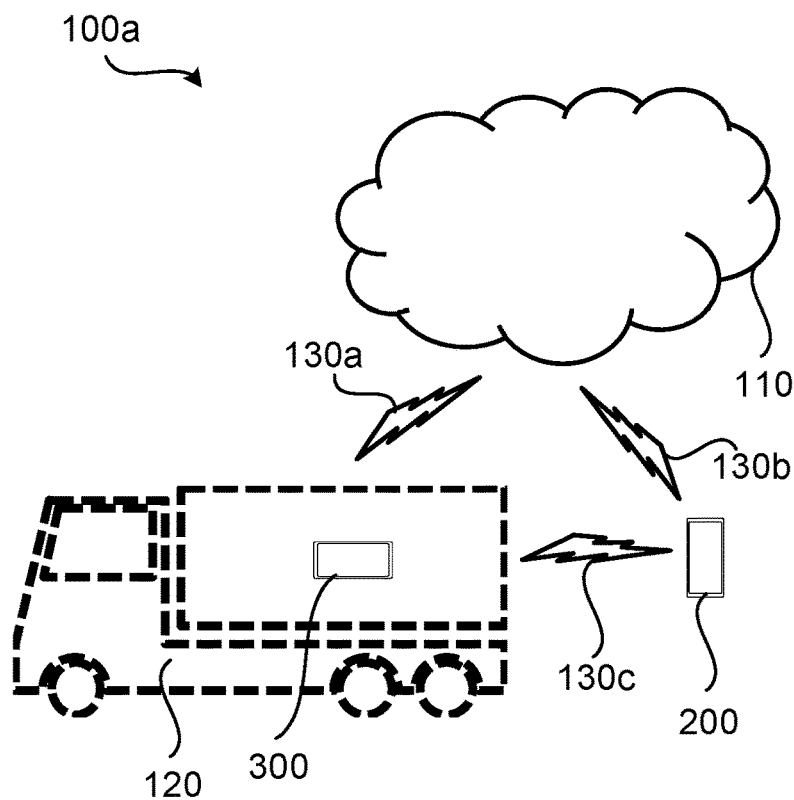
FIGS. 1 and 4 are schematic diagrams illustrating a communication system according to embodiments.

FIG. 1 is a schematic diagram illustrating a communication system 100a where embodiments presented herein can be applied. The communication system 100a comprises an external wide area network 110, a vehicle 120, a user terminal device 200, and a gateway device 300. The gateway device 300 is located in the vehicle 120.

In some aspects, wireless communication is to be established between the gateway device 300 and the external wide area network 110 (as indicated by wireless link 130a), between the user terminal device 200 and the external wide area network 110 (as indicated by wireless link 130b), as well as between the gateway device 300 and the user terminal device 200 (as indicated by wireless link 130c).

The external wide area network 110 might provide communications services, such as packet-switched network services (e.g., Internet access, Vol P communication services), to devices connected to the communications network external wide area network 110. An example of the external wide area network 110 might include a cellular telephone network. In some embodiments, the external wide area network 110 is the Internet.

There could be different examples of user terminal devices 200. The user terminal device 200 could be a wireless device, mobile station, mobile phone, handset, wireless local loop phone, user equipment (UE), or smartphone. In some embodiments, the user terminal device 200 is a mobile phone or a tablet computer.

There could be different examples of gateway devices 300. In some aspects, the gateway devices 300 is a WiFi capable communication unit that is operatively connected to in-vehicle services in the vehicle 120. However, the gateway devices 300 might be incapable of at the same time have wireless link 130a and wireless link 130c in operation.

There could be different examples of vehicles 120. The herein disclosed embodiments are applicable to any vehicle and in particular to heavy-duty vehicles, such as trucks, buses and construction equipment, etc. In some embodiments, the vehicle 120 is a truck.

As noted above, having all three wireless links 130a, 130b, 130c operable at one time might be cumbersome or even not enabled. This might result in that the user terminal devices 200 and the gateway device 300 are incapable to communicate with each other and at the same time communicate with the external wide area network 110. For example, when using tethering for operatively connecting the gateway device 300 to the external wide area network 110 via the user terminal devices 200, data sharing between the user terminal devices 200 and the gateway device 300 might not be possible. For example, when using the gateway device 300 as a wireless access point, neither the user terminal devices 200 nor the gateway device 300 might be enabled to communicate with the external wide area network 110 via the user terminal devices 200.

The embodiments disclosed herein therefore relate to mechanisms for providing wireless network access to an external wide area network 110 and obtaining wireless network access to an external wide area network 110. In order to obtain such mechanisms there is provided a user terminal device 200, a method performed by the user terminal device 200, a computer program product comprising code, for example in the form of a computer program, that when run on processing circuitry of the user terminal device 200, causes the user terminal device 200 to perform the method. In order to obtain such mechanisms there is further provided a gateway device 300, a method performed by the gateway device 300, and a computer program product comprising code, for example in the form of a computer program, that when run on processing circuitry of the gateway device 300, causes the gateway device 300 to perform the method.

According to some embodiments disclosed herein, the user terminal device 200 acts as a nomadic device and is operatively connected to the gateway device 300 in the vehicle 120 as a client. The user terminal device 200 then provides wireless network access to the external wide area network 110 for all traffic as requested from the gateway device 300 as well as from the user terminal device 200 itself, but that the gateway device 300 acts as default gateway for all the data traffic exchanged with the external wide area network 110. In this respect, the gateway device 300 at least is responsible for routing and serves as the forwarding host (router) to the external wide area network 110.

In this respect, aforementioned document U.S. Pat. No. 10,141,967 B1 does not disclose that the gateway device 300 acts as gateway for all data traffic exchanged between the gateway device 300 and the external wide area network 110 as well as for all data traffic exchanged with the user terminal device 200 and the external wide area network 110.

Figure 2:
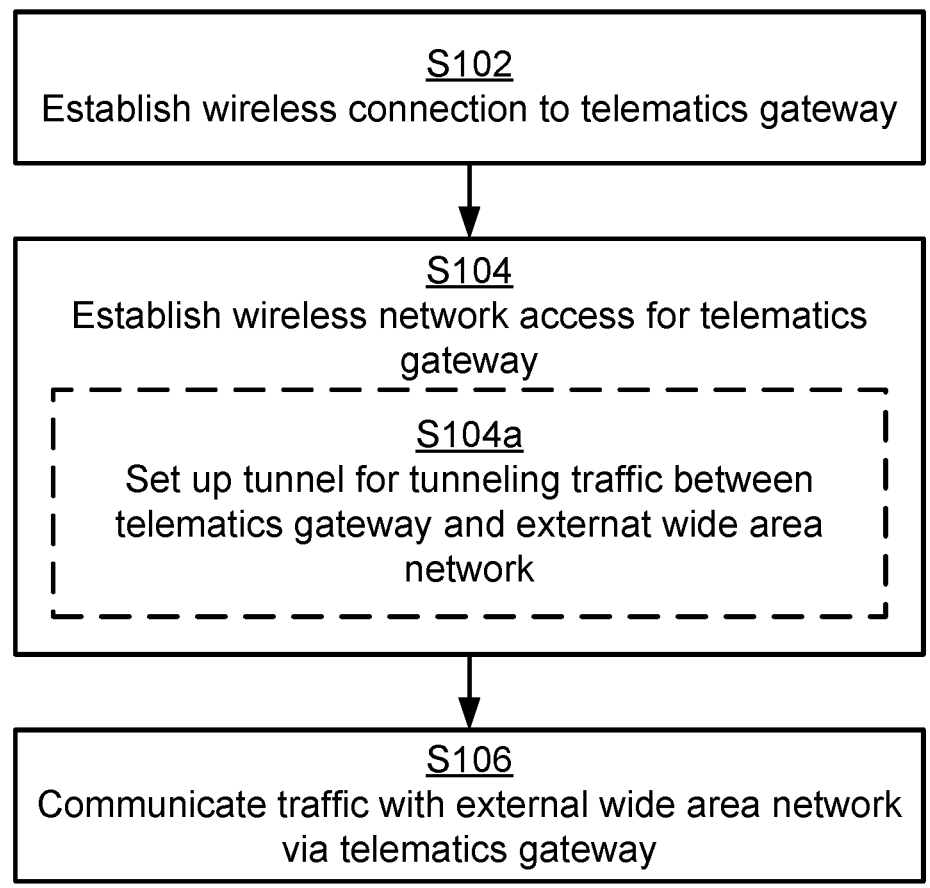
FIGS. 2 and 3 are flowcharts of methods according to embodiments.

Reference is now made to FIG. 2 illustrating a method for providing wireless network access to an external wide area network 110 as performed by the user terminal device 200 according to an embodiment.

The user terminal device 200 connects to the gateway device 300 as a client. Hence, the user terminal device 200 is configured to perform step S102:

S102: The user terminal device 200 establishes a wireless connection to the gateway device 300. The gateway device 300 is located in the vehicle 120. The user terminal device 200 is identified as a client to the gateway device 300. The user terminal device 200 uses the gateway device 300 as gateway for all data traffic exchanged between the user terminal device 200 and the external wide area network 110.

An application in the user terminal device 200 provides connection to the external wide area network 110 for all data traffic as requested from the gateway device 300 as well as from the user terminal device 200 itself but the gateway device 300 acts as gateway for all data traffic exchanged with the external wide area network 110. Hence, the user terminal device 200 is configured to perform step S104:

S104: The user terminal device 200 establishes wireless network access for the gateway device 300 to the external wide area network 110. The gateway device 300 is operatively connected to the external wide area network 110 via the user terminal device 200. The user terminal device 200 bridges all data traffic communicated between the gateway device 300 and the external wide area network 110.

The order in which step S102 and S104 are performed might be interchanged such that step S104 is performed step S102.

Embodiments relating to further details of providing wireless network access to an external wide area network 110 as performed by the user terminal device 200 will now be disclosed.

In some aspects, the wireless connection in S102 is set up whilst the user terminal device 200 maintains its own network connection. That is, in some embodiments, the wireless connection to the gateway device 300 is established whilst the user terminal device 200 maintains wireless network access between itself and the external wide area network 110. This enables the user terminal device 200 to keep its own network access whilst at the time being enabled to wirelessly communicate with the gateway device 300.

In some aspects at least one local application is run in the user terminal device 200. Also data traffic from this at least one local application might then be routed through the gateway device 300. That is, in some embodiments, also data traffic is exchanged between the external wide area network 110 and a local application run in the user terminal device 200. The user terminal device 200 routes this data traffic through the gateway device 300. This enables the user terminal device 200 to run a local application that requires network access whilst at the time being enabled to wirelessly communicate with the gateway device 300.

There might be different ways for the user terminal device 200 to operatively connect the gateway device 300 to the external wide area network 110. In some aspects, the data traffic between the gateway device 300 and the external wide area network 110 is tunnelled in the user terminal device 200. That is, in some embodiments, the user terminal device 200 operatively connects the gateway device 300 to the external wide area network 110 via the user terminal device 200 by the user terminal device 200 tunneling all data traffic between the gateway device 300 and the external wide area network 110.

In some aspects a tunnel is therefore set up for this purpose. Hence, in some embodiments, the user terminal device 200 is configured to perform (optional) step S104a as part of establishing the wireless network access for the gateway device 300 in step S104:

S104a: The user terminal device 200 sets up a tunnel in the user terminal device 200 for tunneling the data traffic between the gateway device 300 and the external wide area network 110.

Such a tunnel might then be used to pipe data traffic to the external wide area network 110 from the gateway device 300, for example, through a radio modem in the user terminal device 200 and to pipe data traffic from the external wide area network 110 to the gateway device 300, for example, through a radio modem in the user terminal device 200.

In some aspects, wireless network access to the external wide area network 110 for at least one other entity in the vehicle 120 is also to be provided. Such wireless network access might then be provided via the user terminal device 200. That is, in some embodiments, the user terminal device 200 is operatively connected to a communication entity in the vehicle 120 via the gateway device 300. Wireless network access to the external wide area network 110 is established also to the communication entity via the user terminal device 200. Also data traffic as exchanged between the communication entity and the external wide area network 110 is routed through the gateway device 300. This data traffic is tunnelled through the user terminal device 200 between the gateway device 300 and the external wide area network 110.

Examples of such other entities will be provided below.

Data traffic might be communicated with the external wide area network 110 once the wireless network access for the gateway device 300 has been established to the external wide area network 110. Hence, in some embodiments, the user terminal device 200 is configured to perform (optional) step S106:

S106: The user terminal device 200 communicates data traffic with the external wide area network 110 whilst using the gateway device 300 as gateway and whilst bridging all data traffic communicated between the gateway device 300 and the external wide area network 110.

Figure 3:
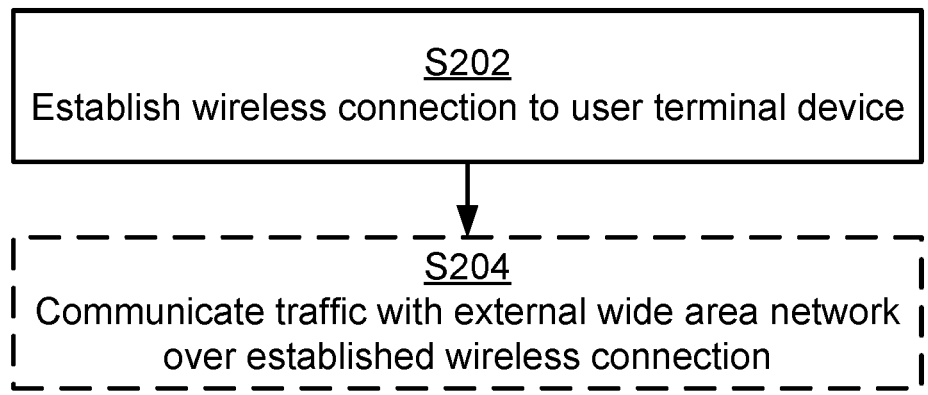

Reference is now made to FIG. 3 illustrating a method for obtaining wireless network access to an external wide area network 110 as performed by the gateway device 300 located in the vehicle 120 according to an embodiment.

As disclosed above, in step S104 the user terminal device 200 establishes wireless network access for the gateway device 300 to the external wide area network 110. Hence, the gateway device 300 is configured to perform step S202:

S202: The gateway device 300 establishes a wireless connection to the user terminal device 200. The user terminal device 200 is identified as a client to the gateway device 300. The gateway device 300 is operatively connected to the external wide area network 110 via the user terminal device 200. The gateway device 300 acts as gateway for all data traffic exchanged between the gateway device 300 and the external wide area network 110 as well as for all data traffic exchanged between the user terminal device 200 and the external wide area network 110.

Embodiments relating to further details of obtaining wireless network access to an external wide area network 110 as performed by the gateway device 300 will now be disclosed.

In some aspects, the gateway device 300 lacks capability to establish wireless link 130a, at least when wireless link 130c is established. Hence, in some embodiments, the gateway device 300 is without capability to itself establish wireless network access to the external wide area network 110.

As disclosed above, in some aspects at least one local application is run in the user terminal device 200. Also data traffic from this at least one local application might then be routed through the gateway device 300. That is, in some embodiments, also data traffic as exchanged between the external wide area network 110 and a local application run in the user terminal device 200 is routed through the gateway device 300.

As disclosed above, in some aspects wireless network access to the external wide area network 110 for at least one other entity in the vehicle 120 is also to be provided. That is, in some embodiments, the gateway device 300 operatively connects the user terminal device 200 to a communication entity in the vehicle 120 via the gateway device 300. Wireless network access to the external wide area network 110 is established also to the communication entity via the user terminal device 200. Also data traffic as exchanged between the communication entity and the external wide area network 110 is routed through the gateway device 300.

There could be different examples of such other entities in the vehicle 120. In some examples, this other entity is a service and entertainment module. For example, this other entity might be configured for content provision, audio/video streaming, provision of order and/or logistics information, etc.

As disclosed above, data traffic might be communicated with the external wide area network 110 once the wireless network access for the gateway device 300 has been established to the external wide area network 110. Hence, in some embodiments, the gateway device 300 is configured to perform (optional) step S204:

S204: The gateway device 300 communicates data traffic with the external wide area network 110 over the wireless connection to the user terminal device 200.

There could be different ways for the wireless connection to be established between the user terminal device 200 and the gateway device 300. In some embodiments this wireless connection is a WiFi connection (i.e., a wireless networking technology based on the IEEE 802.11 family of standards).

Figure 4:
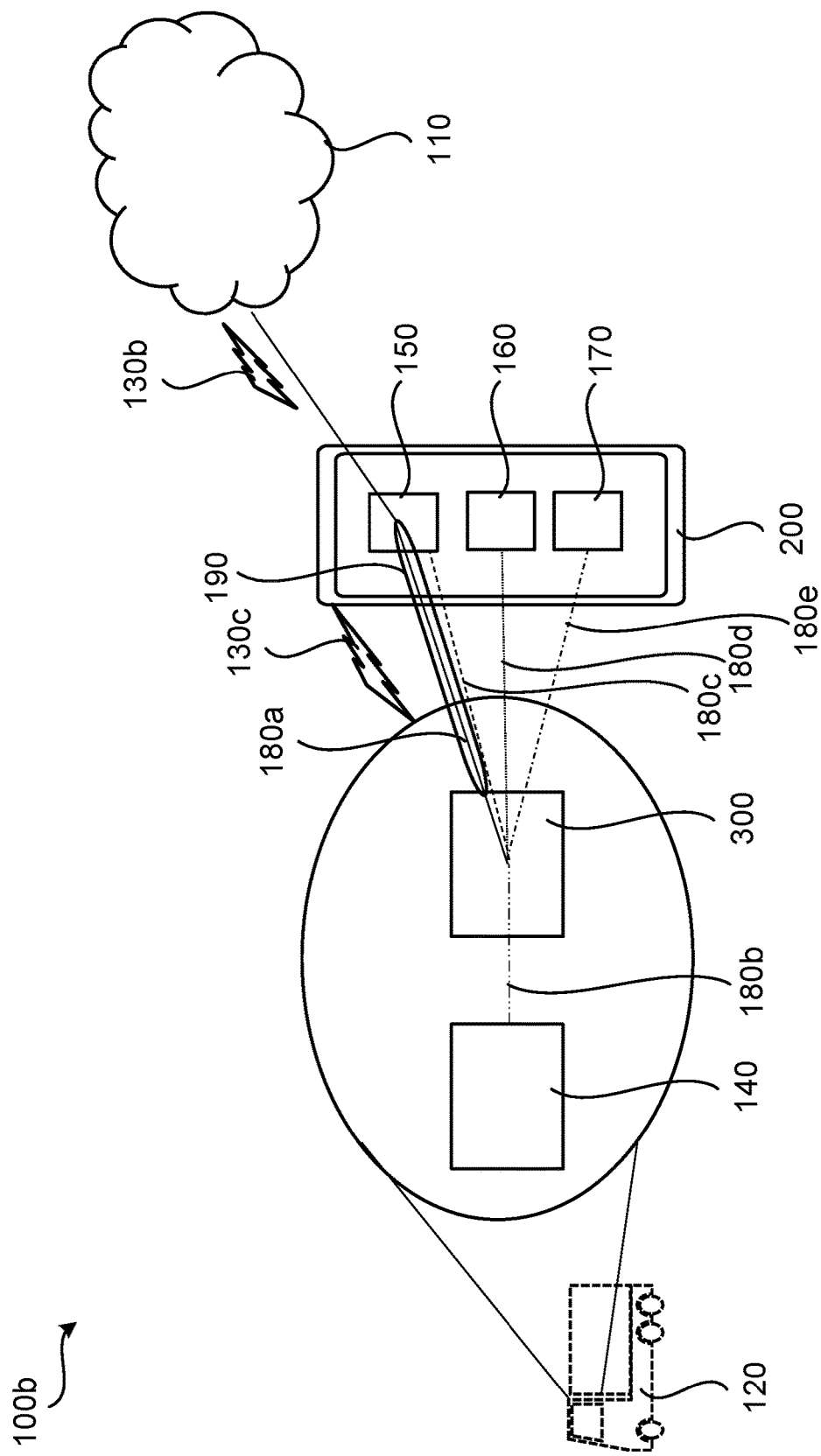

FIG. 4 is a schematic diagram illustrating a communication system 100b similar to the communication system 100a and where embodiments presented herein can be applied. The communication system 100b comprises an external wide area network 110, a vehicle 120, a user terminal device 200, a gateway device 300, and a communication entity 140.

The gateway device 300 and the communication entity 140 are located in the vehicle 120. The user terminal device 200 and the gateway device 300 communicate over wireless link 130c. The gateway device 300 is operatively connected to the external wide area network 110 via the user terminal device 200. The terminal device 200 comprises a radio modem 150 configured for wireless communication with the external wide area network 110 over wireless link 130b. A local application 160 is run in the user terminal device 200. A further application 170 that interacts with the vehicle 120 is run in the user terminal device 200. The gateway device 300 acts as gateway for all data traffic exchanged between the gateway device 300 and the external wide area network 110 as well as for all data traffic exchanged between the user terminal device 200 and the external wide area network 110.

In FIG. 4 is illustrated that data traffic as exchanged between the external wide area network 110 and the local application 160 run in the user terminal device 200 is routed through the gateway device 300. At interface 180a is illustrated data traffic as tunnelled in a tunnel 190 between the gateway device 300 and the modem 150 for exchange with the external wide area network 110. The data traffic between the gateway device 300 and the external wide area network 110 is thereby tunnelled in the user terminal device 200. At interface 180b is illustrated data traffic exchanged between the gateway device 300 and the communication entity 140. At interface 180c is illustrated data traffic exchanged between the gateway device 300 and the modem 150 as terminated in the modem (e.g. modem originating data traffic destined for exchange with the external wide area network 110 via the gateway device 300 or modem terminating data traffic exchanged with the external wide area network 110 via the gateway device 300). At interface 180d is illustrated data traffic exchanged between the local application 160 and the gateway device 300. At interface 180e is illustrated data traffic exchanged between the further application 170 and the gateway device 300 (e.g. for further exchange between the gateway device 300 and the communication entity 140 over interface 180b).

Figure 5:
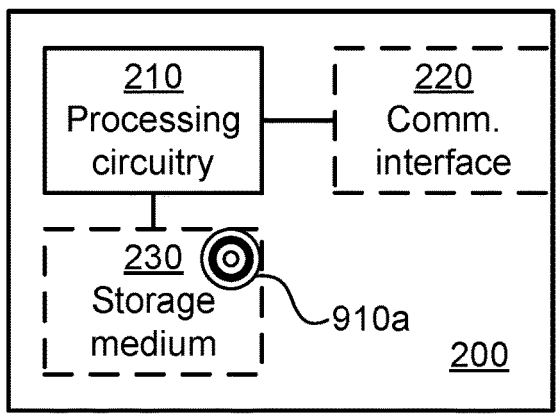
FIG. 5 is a schematic diagram showing functional units of a user terminal device according to an embodiment.

FIG. 5 schematically illustrates, in terms of a number of functional units, the components of a user terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the user terminal device 200 to perform a set of operations, or steps, as disclosed above. For example, the storage medium 230 may store the set of operations, and the processing circuitry 210 may be configured to retrieve the set of operations from the storage medium 230 to cause the user terminal device 200 to perform the set of operations. The set of operations may be provided as a set of executable instructions. Thus the processing circuitry 210 is thereby arranged to execute methods as herein disclosed. For example, the processing circuitry 210 might be configured to perform instructions of the applications 160, 170.

The storage medium 230 may also comprise persistent storage, which, for example, can be any single one or combination of magnetic memory, optical memory, solid state memory or even remotely mounted memory. For example, the storage medium 230 might store instructions for performing by the applications 160, 170.

The user terminal device 200 may further comprise a communications interface 220 for communications with other devices, functions, nodes and entities, as in FIGS. 1 and 4. As such the communications interface 220 may comprise one or more transmitters and receivers, comprising analogue and digital components. For example, the communications interface 220 might implement the modem 150.

The processing circuitry 210 controls the general operation of the user terminal device 200 e.g. by sending data and control signals to the communications interface 220 and the storage medium 230, by receiving data and reports from the communications interface 220, and by retrieving data and instructions from the storage medium 230. Other components, as well as the related functionality, of the user terminal device 200 are omitted in order not to obscure the concepts presented herein.

Figure 6:
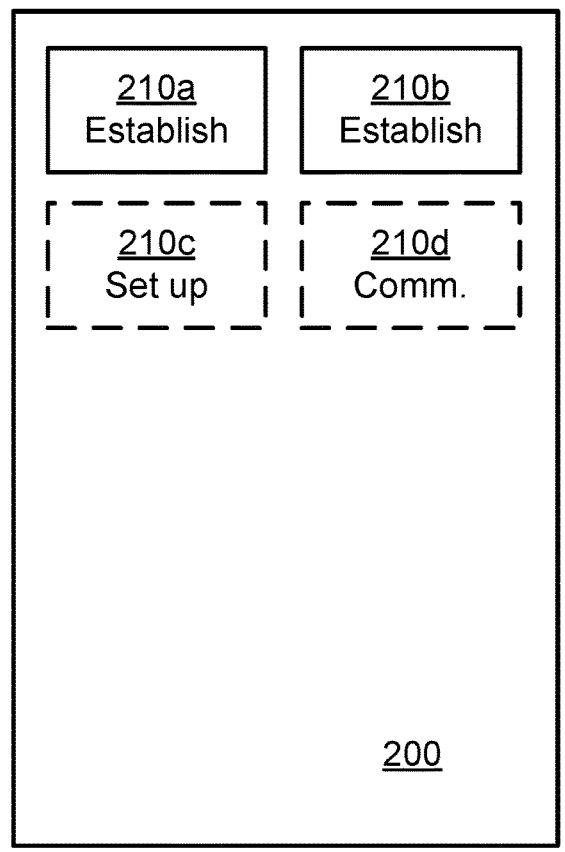
FIG. 6 is a schematic diagram showing functional modules of a user terminal device according to an embodiment.

FIG. 6 schematically illustrates, in terms of a number of functional modules, the components of a user terminal device 200 according to an embodiment. The user terminal device 200 of FIG. 6 comprises a number of functional modules; a first establish module 210a configured to perform step S102, and a second establish module 210b configured to perform step S104. The user terminal device 200 of FIG. 6 may further comprise a number of optional functional modules, such as any of a set-up module 210c configured to perform step S104a, and a communicate module 210d configured to perform step S106. In general terms, each functional module 210a-210d may be implemented in hardware or in software. Preferably, one or more or all functional modules 210a-210d may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210d and to execute these instructions, thereby performing any steps of the user terminal device 200 as disclosed herein.

Figure 7:
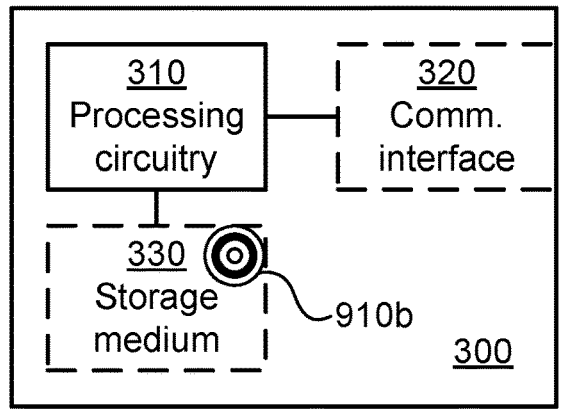
FIG. 7 is a schematic diagram showing functional units of a gateway device according to an embodiment.

FIG. 7 schematically illustrates, in terms of a number of functional units, the components of a gateway device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the gateway device 300 to perform a set of operations, or steps, as disclosed above. For example, the storage medium 330 may store the set of operations, and the processing circuitry 310 may be configured to retrieve the set of operations from the storage medium 330 to cause the gateway device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The gateway device 300 may further comprise a communications interface 320 for communications with other devices, functions, nodes and entities, as in FIGS. 1 and 4. As such the communications interface 320 may comprise one or more transmitters and receivers, comprising analogue and digital components.

The processing circuitry 310 controls the general operation of the gateway device 300 e.g. by sending data and control signals to the communications interface 320 and the storage medium 330, by receiving data and reports from the communications interface 320, and by retrieving data and instructions from the storage medium 330. Other components, as well as the related functionality, of the gateway device 300 are omitted in order not to obscure the concepts presented herein.

Figure 8:
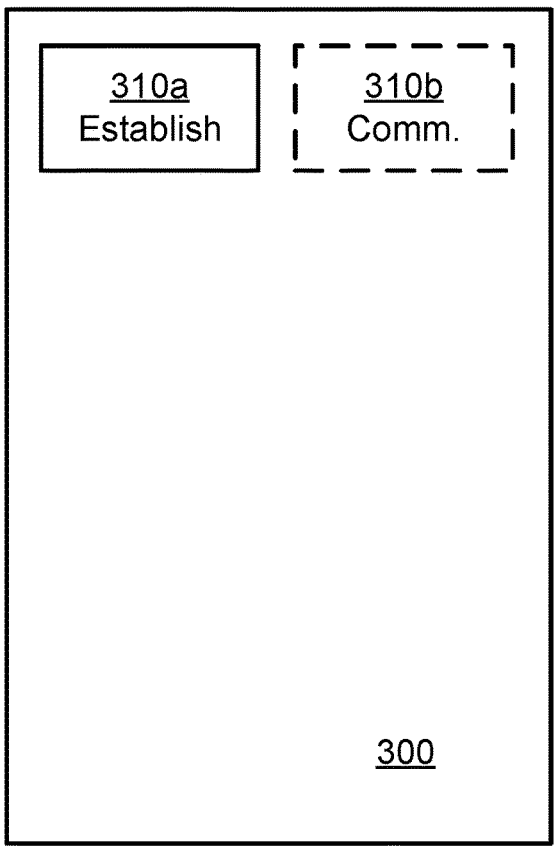
FIG. 8 is a schematic diagram showing functional modules of a gateway device according to an embodiment.

FIG. 8 schematically illustrates, in terms of a number of functional modules, the components of a gateway device 300 according to an embodiment. The gateway device 300 of FIG. 8 comprises an establish module 310a configured to perform step S202. The gateway device 300 of FIG. 8 may further comprise a number of optional functional modules, such as a communicate module 310b configured to perform step S204. In general terms, each functional module 310a-310b may be implemented in hardware or in software. Preferably, one or more or all functional modules 310a-310b may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310b and to execute these instructions, thereby performing any steps of the gateway device 300 as disclosed herein.

Figure 9:
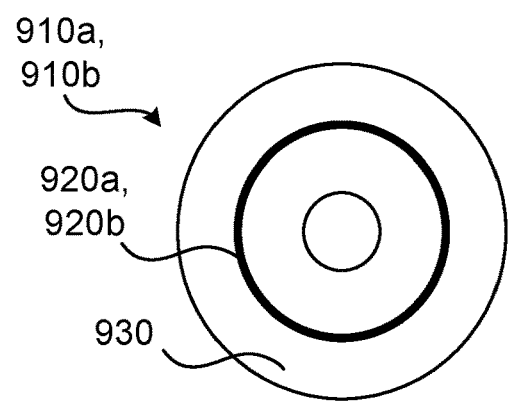
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920*a* and/or computer program product 910*a* may thus provide means for performing any steps of the user terminal device 200 as herein disclosed. On this computer readable means 930, a computer program 920*b* can be stored, which computer program 920*b* can cause the processing circuitry 310 and thereto operatively coupled entities and devices, such as the communications interface 320 and the storage medium 330, to execute methods according to embodiments described herein. The computer program 920*b* and/or computer program product 910*b* may thus provide means for performing any steps of the gateway device 300 as herein disclosed.

In the example of FIG. 9, the computer program product 910*a*, 910*b* is illustrated as an optical disc, such as a CD (compact disc) or a DVD (digital versatile disc) or a Blu-Ray disc. The computer program product 910*a*, 910*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920*a*, 920*b* is here schematically shown as a track on the depicted optical disk, the computer program 920*a*, 920*b* can be stored in any way which is suitable for the computer program product 910*a*, 910*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A user terminal device for providing wireless network access to an external wide area network, the user terminal device comprising processing circuitry, the processing circuitry being configured to cause the user terminal device to:
   establish a wireless connection to a gateway device located in a vehicle, whereby the user terminal device is identified as a client to the gateway device, wherein the user terminal device is configured to use the gateway device as gateway for all data traffic exchanged between the user terminal device and the external wide area network; and
   establish wireless network access for the gateway device to the external wide area network, whereby the gateway device is operatively connected to the external wide area network via the user terminal device, wherein the user terminal device is configured to bridge all data traffic communicated between the gateway device and the external wide area network.

2. The user terminal device according to claim 1, wherein the wireless connection to the gateway device is established whilst the user terminal device maintains wireless network access between itself and the external wide area network.

3. The user terminal device according to claim 1, wherein also data traffic is exchanged between the external wide area network and a local application run in the user terminal device, whereby the user terminal device is configured to route this data traffic through the gateway device.

4. The user terminal device according to claim 1, wherein the user terminal device is configured to operatively connect the gateway device to the external wide area network via the user terminal device by the user terminal device being configured to tunnel all data traffic between the gateway device and the external wide area network.

5. The user terminal device according to claim 4, further being configured to:
   set up a tunnel in the user terminal device for tunneling the data traffic between the gateway device and the external wide area network as part of is being configured to establish wireless network access for the gateway device to the external wide area network.

6. The user terminal device according to claim 1, wherein the user terminal device is configured to be operatively connected to a communication entity in the vehicle via the gateway device, wherein wireless network access to the external wide area network is established also to said communication entity via the user terminal device, whereby also data traffic as exchanged between the communication entity and the external wide area network is routed through the gateway device, and wherein this data traffic is tunnelled through the user terminal device between the gateway device and the external wide area network.

7. The user terminal device according to claim 6, wherein the communication entity is a service and entertainment module.

8. The user terminal device according to claim 1, further being configured to:
   communicate data traffic with the external wide area network whilst being configured to use the gateway device as gateway and whilst being configured to bridge all data traffic communicated between the gateway device and the external wide area network.

9. The user terminal device or gateway device according to claim 1, wherein the external wide area network is the Internet.

10. The user terminal device or gateway device according to claim 1, wherein the wireless connection established between the user terminal device and the gateway device is a WiFi connection.

11. The user terminal device according to claim 1, wherein the user terminal device is a mobile phone or a tablet computer.

12. The user terminal device or gateway device according to claim 1, wherein the vehicle is a truck.

13. A gateway device for obtaining wireless network access to an external wide area network, the gateway device being located in a vehicle and comprising processing circuitry, the processing circuitry being configured to cause the gateway device to:
   establish a wireless connection to a user terminal device, whereby the user terminal device is identified as a client to the gateway device, wherein the gateway device is operatively connected to the external wide area network via the user terminal device, and wherein the gateway device is configured to act as gateway for all data traffic exchanged between the gateway device and the external wide area network as well as for all data traffic exchanged between the user terminal device and the external wide area network.

14. The gateway device according to claim 13, wherein the gateway device is without capability to itself establish wireless network access to the external wide area network.

15. The gateway device according to claim 13, wherein also data traffic as exchanged between the external wide area network and a local application run in the user terminal device is routed through the gateway device.

16. The gateway device according to claim 13, wherein the gateway device is configured to operatively connect the user terminal device to a communication entity in the vehicle via the gateway device, wherein wireless network access to the external wide area network is established also to the communication entity via the user terminal device, whereby also data traffic as exchanged between the communication entity and the external wide area network is routed through the gateway device.

17. The gateway device according to claim 16, wherein the communication entity is a service and entertainment module.

18. The gateway device according to claim 13, further being configured to:
- communicate data traffic with the external wide area network over the wireless connection to the user terminal device.

19. A method for providing wireless network access to an external wide area network, the method being performed by a user terminal device, the method comprising:
- establishing a wireless connection to a gateway device located in a vehicle, whereby the user terminal device is identified as a client to the gateway device, wherein the user terminal device uses the gateway device as gateway for all data traffic exchanged between the user terminal device and the external wide area network; and
- establishing wireless network access for the gateway device to the external wide area network, whereby the gateway device is operatively connected to the external wide area network via the user terminal device, wherein the user terminal device bridges all data traffic communicated between the gateway device and the external wide area network.

20. A method for obtaining wireless network access to an external wide area network, the method being performed by a gateway device, the gateway device being located in a vehicle, the method comprising:
- establishing a wireless connection to a user terminal device, whereby the user terminal device is identified as a client to the gateway device, wherein the gateway device is operatively connected to the external wide area network via the user terminal device, and wherein the gateway device acts as gateway for all data traffic exchanged between the gateway device and the external wide area network as well as for all data traffic exchanged between the user terminal device and the external wide area network.

21. A computer program product for providing wireless network access to an external wide area network, the computer program product comprising a computer program and a non-volatile computer readable storage medium on which the computer program is stored, the computer program comprising computer code which, when run on processing circuitry of a user terminal device, causes user terminal device to:
- establish a wireless connection to a gateway device located in a vehicle, whereby the user terminal device is identified as a client to the gateway device, wherein the user terminal device uses the gateway device as gateway for all data traffic exchanged between the user terminal device and the external wide area network; and
- establish wireless network access for the gateway device to the external wide area network, whereby the gateway device is operatively connected to the external wide area network via the user terminal device, wherein the user terminal device bridges all data traffic communicated between the gateway device and the external wide area network.

22. A computer program product for obtaining wireless network access to an external wide area network, the computer program product comprising a computer program and a non-volatile computer readable storage medium on which the computer program is stored, the computer program comprising computer code which, when run on processing circuitry of a gateway device located in a vehicle, causes the gateway device to:
- establish a wireless connection to a user terminal device, whereby the user terminal device is identified as a client to the gateway device, wherein the gateway device is operatively connected to the external wide area network via the user terminal device, and wherein the gateway device acts as gateway for all data traffic exchanged between the gateway device and the external wide area network as well as for all data traffic exchanged between the user terminal device and the external wide area network.

* * * * *